United States Patent
Touboul et al.

(10) Patent No.: US 10,338,660 B2
(45) Date of Patent: Jul. 2, 2019

(54) METHOD AND APPARATUS FOR DYNAMIC SLEEP MODE BASED ON PREDICTED COMMUNICATION ACTIVITY

(71) Applicant: QUALCOMM INCORPORATED, San Diego, CA (US)

(72) Inventors: Assaf Touboul, Netanya (IL); Ron Bercovich, Kfar-Saba (IL); Ran Berliner, Kfar-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/659,336

(22) Filed: Jul. 25, 2017

(65) Prior Publication Data

US 2018/0107263 A1 Apr. 19, 2018

Related U.S. Application Data

(60) Provisional application No. 62/407,801, filed on Oct. 13, 2016.

(51) Int. Cl.
*G06F 1/3209* (2019.01)
*G06F 1/3203* (2019.01)
(Continued)

(52) U.S. Cl.
CPC .......... *G06F 1/3209* (2013.01); *G06F 1/3203* (2013.01); *G06F 1/3278* (2013.01); *G06F 1/3287* (2013.01); *H04W 76/27* (2018.02); *H04W 76/28* (2018.02); *G06F 1/324* (2013.01); *H04W 52/0258* (2013.01); *Y02D 10/157* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01); *Y02D 70/24* (2018.01)

(58) Field of Classification Search
CPC .... G06F 1/3209; G06F 1/3203; G06F 1/3278; G06F 1/3287; H04W 76/28; H04W 76/27
See application file for complete search history.

(56) References Cited

FOREIGN PATENT DOCUMENTS

| WO | 2015109153 A1 | 7/2015 |
|----|---------------|--------|
| WO | 2017146535 A1 | 8/2017 |

OTHER PUBLICATIONS

Huawei et al., "UE Power Saving Mechanism in High Frequency", 3GPP Draft; R2-166912, 3rd Generation Partnership Project (3GPP), Mobile Competence Centre; 650, Route Des Lucioles; F-06921 Sophia-Anti Polls Cedex; France, vol. RAN WG2, No. Kaohsiung; Oct. 9, 2016, XP051151346, Retrieved from the Internet: URL:http://www.3gpp.org/ftp/Meetings_3GPP_SYNC/RAN2/Docs/ [retrieved on Oct. 9, 2016], 4 pages.

(Continued)

*Primary Examiner* — Ronald B Abelson
(74) *Attorney, Agent, or Firm* — Smith Tempel Blaha LLC

(57) ABSTRACT

A method for communicating system activity in a communication system includes receiving communication beam activity information, the communication beam activity information related to communication information destined for a user device on a communication beam, the communication beam activity information comprising information relating to data activity on the communication beam, and using the communication beam activity information to determine a period within which the user device may enter an inactive state.

24 Claims, 11 Drawing Sheets

(51) Int. Cl.
    *G06F 1/3234*     (2019.01)
    *G06F 1/3287*     (2019.01)
    *H04W 76/28*     (2018.01)
    *H04W 76/27*     (2018.01)
    *G06F 1/324*     (2019.01)
    *H04W 52/02*     (2009.01)

(56) References Cited

OTHER PUBLICATIONS

International Search Report and Written Opinion—PCT/US2017/055011—ISA/EPO—dated Jan. 3, 2018.
Saily M., et al., "Mobile and Wireless Communications Enablers for the Twenty-twenty Information Society—II Deliverable D6.1 Draft Asynchronous Control Functions and Overall Control Plane Design", Jun. 30, 2016, XP055322758, Retrieved from the Internet: URL:https://metis-ii.5g-ppp.eu/wp-content/uploads/deliverables/METIS-II_D6.1_ V1.0.pdf [retrieved on Nov. 24, 2016], 113 pages.

METHOD AND APPARATUS FOR DYNAMIC SLEEP MODE BASED ON PREDICTED COMMUNICATION ACTIVITY

RELATED APPLICATIONS

This application claims the benefit of U.S. Provisional Patent Application No. 62/407,801, entitled "5G Dynamic Sleep Mode Based On Predicted Communication Activity," filed Oct. 13, 2016, the contents of which are hereby incorporated by reference in their entirety.

TECHNICAL FIELD

The present disclosure relates to wireless communication systems, and more particularly to dynamic sleep in wireless communications. Embodiments enable and provide the ability for a user equipment (UE) to dynamically enter a sleep mode based on predicted communication activity.

INTRODUCTION

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, each otherwise known as user equipment (UE). A base station may communicate with one or more UEs on downlink channels (e.g., for transmissions from a base station to a UE) and uplink channels (e.g., for transmissions from a UE to a base station). UEs may locate a base station by detecting synchronization signal(s) from which the UEs acquire the base station identification code (cell ID), system timing information, frame alignment information, transmission and reception frequency information, etc. In systems where the receiver is highly signal strength and noise limited (e.g., millimeter wave systems), beamformed synchronization signals may be swept across the cell coverage area to provide coverage enhancement to improve detection.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for communicating system activity in a communication system. Method embodiments can include receiving communication beam activity information, the communication beam activity information related to communication information destined for a user device on a communication beam, the communication beam activity information comprising information relating to data activity on the communication beam, and using the communication beam activity information to determine a period within which the user device may enter an inactive state.

Another aspect of the disclosure provides an apparatus for communicating system activity in a communication system including a user device configured to receive communication beam activity information, the communication beam activity information related to communication information destined for the user device on a communication beam, the communication beam activity information comprising information relating to data activity on the communication beam, and the user device configured to use the communication beam activity information to determine a period within which the user device may enter an inactive state.

Another aspect of the disclosure provides a device including means for receiving communication beam activity information, the communication beam activity information related to communication information destined for a user device on a communication beam, the communication beam activity information comprising information relating to data activity on the communication beam, and means for using the communication beam activity information to determine a period within which the user device may enter an inactive state.

Another aspect of the disclosure provides a non-transitory computer-readable medium storing computer executable code for communicating system activity in a communication system, the code executable by a processor to receive communication beam activity information, the communication beam activity information related to communication information destined for a user device on a communication beam, the communication beam activity information comprising information relating to data activity on the communication beam, and use the communication beam activity information to determine a period within which the user device may enter an inactive state.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
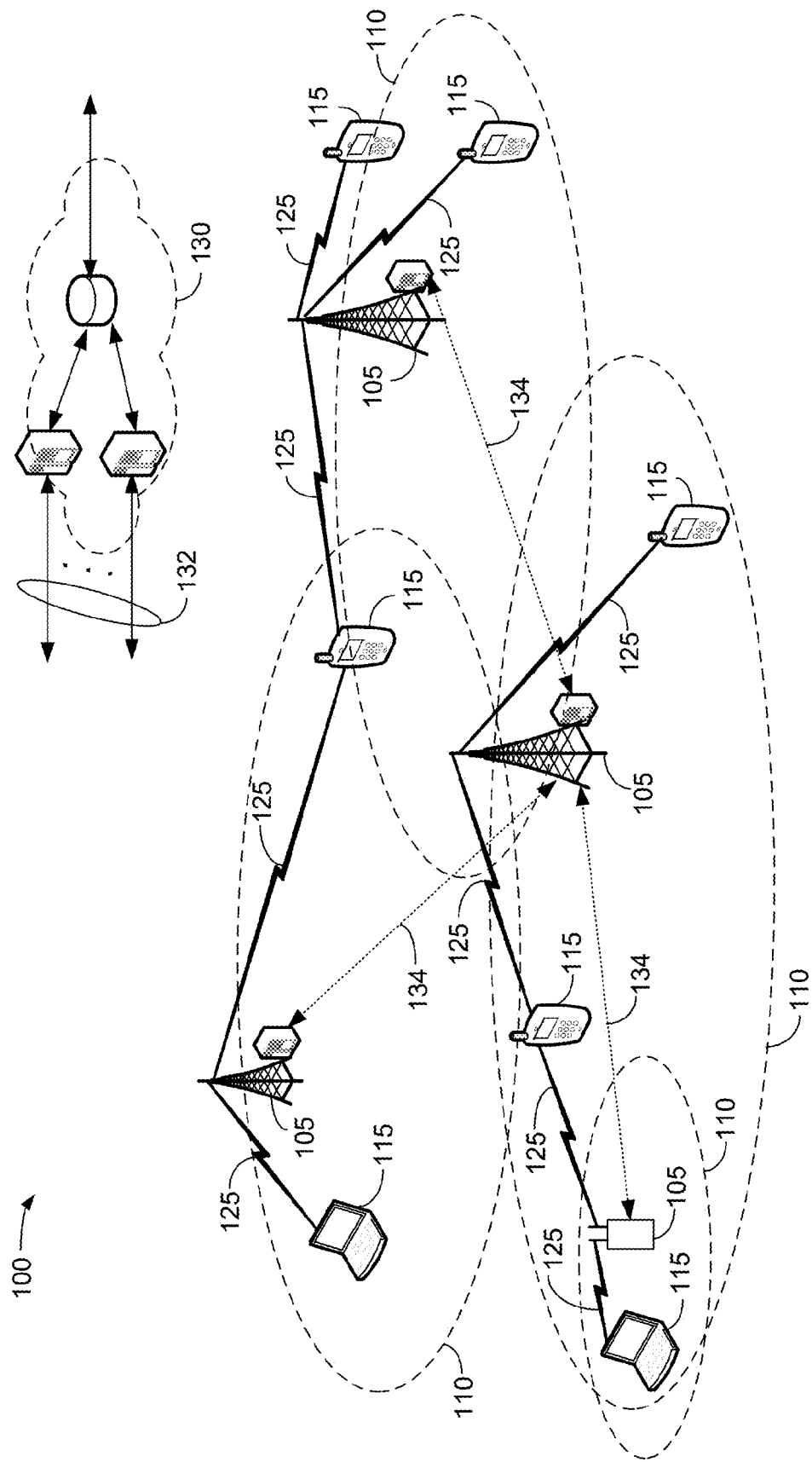
FIG. 1 is a diagram showing a wireless communication system, in accordance with various aspects of the present disclosure.

The word "exemplary" is used herein to mean "serving as an example, instance, or illustration." Any aspect described herein as "exemplary" is not necessarily to be construed as preferred or advantageous over other aspects.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

To provide adequate power in a millimeter wave system, multiple directional beams may be swept across the cell coverage area so that adequate power may be transmitted to a UE and so that adequate power may be received from a UE. The multiple beams are directional such that they are each separated by a few degrees.

A base station may communicate with a number of UEs over one of a number of available communication beams. Such a communication beam may be referred to as a "serving beam." In general, when a UE is communicating with a base station, it is fully operational and consuming maximum power. However, there may be periods of inactivity, where a base station may not have any information to send to a UE, and where a UE may not have any information to send to a base station. Due to the nature of the millimeter wave communication system that uses multiple beams, in general, each UE is continually coupled to a communication channel to receive a physical downlink control channel (PDCCH) communication on each of a number of communication subframes, which results in a constant power consumption, even if there is no communication destined for that particular UE.

Therefore, it would be desirable to have a way of determining and communicating to a UE ahead of time that a base station may not have any information for a UE for a certain period of time, thus allowing a UE to enter a period of inactivity for a predicted period of time if the UE also does not have any information to send to the base station for the predicted period of time.

Exemplary embodiments of the disclosure are directed to a base station determining and communicating to a UE that the base station may not have any information destined for a communication beam associated with that UE for a predicted period of time. Once this communication is received by a UE, the UE may determine that it does not have any information to send to the base station for a particular period of time, and the UE may then enter a sleep mode for a period of time associated with the predicted time period of inactivity sent by the base station. The period of time may be determined, or predicted, by the base station, or may be determined by the UE based on whether the UE has information to communicate to the base station.

In an exemplary embodiment, when a base station and a UE are in what is referred to as "5G RRC-Connected (Radio Resource Control-Connected)" state, the UE may sleep in two situations. In a first situation, the UE may enter what is referred to as "macro sleep," where it may sleep for up to approximately 0.512 seconds. This may occur during long or short gaps when in C-DRX (connected-discontinuous reception) mode. In a second situation, the UE may enter what is referred to as "micro sleep," where it may sleep for up to 12 symbol periods (approximately 170 micro seconds (us), in an exemplary embodiment. This may occur, for example, when the UE identifies that there is no data (physical downlink shared channel (PDSCH)) scheduled for the current subframe, and the UE thus may enter a micro sleep mode until the next subframe boundary.

However, in a 5G communication system, when a discontinuous reception (DRX) inactivity timer is running, or when the UE is not configured in C-DRX mode, both of these conditions corresponding to the UE actively communicating with a base station, only micro sleep is available. Therefore, it would be desirable for the UE to have the ability to sleep for longer periods of time than those available in micro sleep.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through a first set of backhaul links 132 (e.g., S1, etc.) and may perform radio configuration and scheduling for communication with the UEs 115, or may operate under the control of a base station controller (not shown). In accordance with an exemplary embodiment, the base stations 105 may communicate, either directly or indirectly (e.g., through core network 130), with each other over a second set of backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. In a 5G or New Radio (NR) network, a base station may be referred to as a gNodeB (gNB) or a millimeter wave base station (mWB). The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 may be one or more of an LTE/LTE-A network and a 5G network. In LTE/LTE-A networks, the term evolved Node B (eNB) or in a 5G network, the term millimeter wave B (mWB) may be generally used to describe the base stations 105, while the term UE may be generally used to describe the UEs 115. In contrast, in 5G or New Radio (NR) networks, base stations 105 may be referred to as gNBs. The wireless communications system 100 may be a Heterogeneous LTE/LTE-A and 5G network in which different types of eNBs and/or mWBs provide coverage for various geographical regions. For example, each eNB, mWB, or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context. In some examples, the wireless communications system 100 may be, or may include a millimeter wave communication network.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs/gNBs, small cell eNBs/gNBs, mWBs, relay base stations, and the like. A UE 115 may also be able to communicate with other UEs either within or outside the same coverage area of a base station via D2D communications.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers or component carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support directional synchronization signal for millimeter wave detection and synchronization. For example, a millimeter wave base station (mWB) 105 may transmit a directional synchronization signal in a sweeping pattern to UEs 115 within its coverage area 110. The base station 105 may configure a narrowband signal of the synchronization signal to convey correlation information, such as location information (e.g., based on cell ID information included or conveyed in the narrowband signal), for a wideband signal of the synchronization signal. Hereinafter, information regarding the properties of the wideband signal may be referred to as "correlation information." The base station 105 may link the wideband signal to the location of the narrowband signal. In some examples, the identification information of the base station 105 may be included or conveyed in the narrowband signal. The identification information may convey the location information, e.g., the UE 115 may perform a function based on the base station 105 identification number and/or access a lookup table. The base station 105 may send the wideband signal component of the synchronization signal according to the correlation information in the narrowband signal.

A UE 115 may receive the narrowband signal of the synchronization signal for the millimeter wave communication network and determine the correlation information associated with the wideband signal from the narrowband signal. For example, the UE 115 may identify the base station 105 sending the narrowband signal, may determine the base station 105 identity based on the frequency of the narrowband signal, etc., to determine the correlation information. The UE 115 may use the correlation information to identify and receive the wideband signal. In some examples, the UE 115 may determine timing information based on the narrowband signal and/or the wideband signal components of the synchronization signal, e.g., system timing, frame boundary/length timing, etc.

In an exemplary embodiment, the UE 115 is capable of communicating signals via the LTE network and via an mmW system (e.g., as a part of a 5G/NR system). Accordingly, the UE 115 may communicate with the base station 105 over a LTE link. Additionally, the UE 115 may communicate with a connection point (CP), a base station (BS) (capable of mmW system communication), or a millimeter wave base station (mmW-BS) over an mmW link.

In a further exemplary embodiment, at least one of the base stations 105 may be capable of communicating signals via the LTE network and the mmW system over one or more communication links 125. As such, a base station 105 may be referred to as a LTE+mmW eNB or gNB or as a LTE+mmW CP/BS/mmW-BS.

In an exemplary embodiment, a UE 115 may be operatively coupled to a base station 105 using a millimeter wave communication link that may use multiple beams. The multiple beams may be directional such that they are separated by a few degrees.

One or more UEs 115 may be in communication with a base station 105 over each beam. When a UE 115 is operatively communicating with a base station 105 over a beam, that beam may be referred to as a serving beam. The serving beam communicates all information between the UE 115 and the base station 105, including, for example, synchronization, timing, beam information, data, etc.

In an exemplary embodiment, because a base station 105 communicates with one or more UEs 115 using one of a number of different available communication beams, a base station 105 includes a scheduler that schedules the information that is to be transmitted to each UE 115 on each serving beam, and includes communication beam activity information. The scheduler in the base station 105 controls the flow of communication destined for each UE 115, so the base station 105 can predict the communication activity for each UE 115 on each serving beam. For example, if the scheduler in the base station 105 knows that in the next period of time, for example only, 5 milliseconds (ms), that there is no communication destined for a particular serving beam (and therefore, any UE 115 on that serving beam), then any UE 115 that is coupled to the base station 105 on that serving beam may enter a period of inactivity, also referred to as a dynamic sleep mode, for that period of time, assuming that the UE 115 has no communication destined for the base station 105 during that period of time. Such a period of inactivity allows the UE to conserve battery power and extend battery operating life.

For example, a base station 105 and a UE 115 may be in operative bi-directional communication over a serving beam. When the base station 105 has a communication for a UE 115, the scheduler in the base station 105 may schedule a DCI-PDSCH (downlink control information-physical downlink shared channel) communication to the UE 115 on the serving beam. Using this scheduling information, the base station 105 can predict which beams (and therefore, which UEs) may be destined to receive a communication in the next M subframes, where M is variable and may depend on, for example, the operation and implementation of the scheduler in the base station 105. The base station 105 can include this information on the serving beam as part of the communication to all UEs 115 on the serving beam. Each UE 115 can receive this information and determine that it may sleep for M−1 subframes, assuming the UE 115 does not have any information destined for the base station 105 in that M−1 subframe period.

In alternative exemplary embodiments, the scheduling information may be sent by the base station 105 to the UE 115 on the serving beam as part of a synchronization frame (for example, as part of a physical broadcast channel (PBCH) communication), as part of the DCI communication (for example, as a Downlink Control with Beam Scheduling (DcBS) communication), as part of a data communication (for example, as part of a PDSCH channel having, for example, a Downlink data with Beam Scheduling (DdBS)) communication, a Beam Scheduling with Radio Network Temporary Identifier (BS-RNTI) communication, or other communications.

Figure 2:
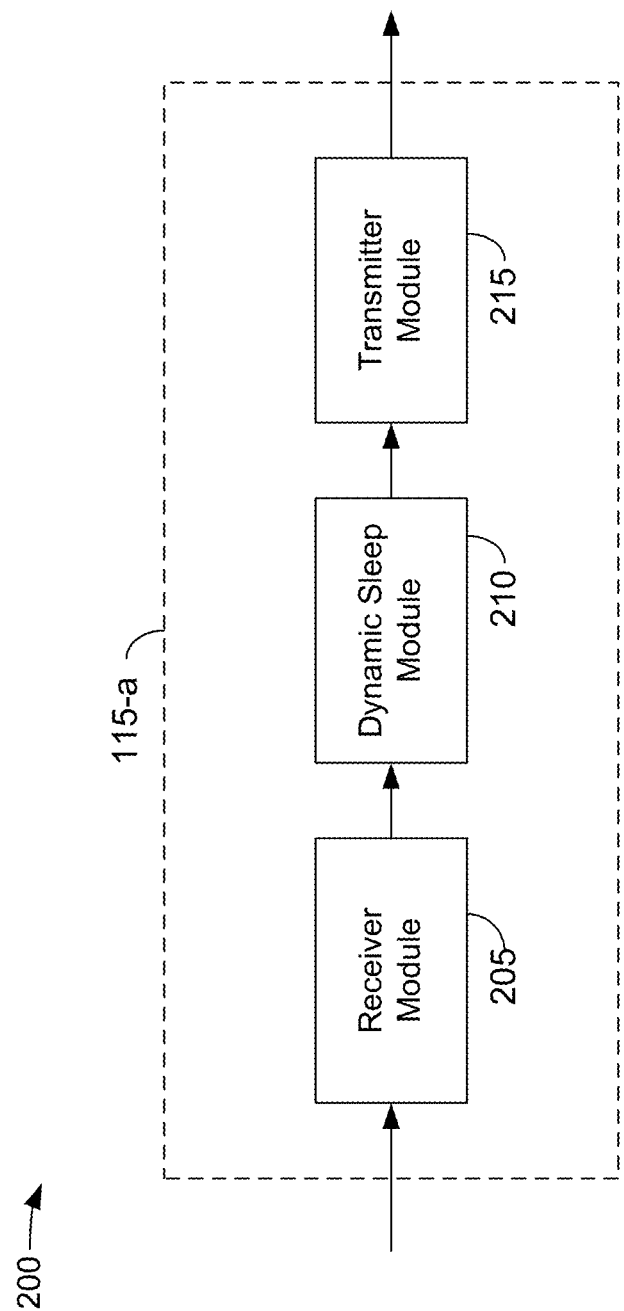
FIG. 2 is a block diagram showing a device configured for use in wireless communication, in accordance with various aspects of the present disclosure.

FIG. 2 is a block diagram 200 of a device 115-a for use in wireless communication, in accordance with various aspects of the present disclosure. The device 115-a may be an example of one or more aspects of a UE 115 described with reference to FIG. 1. The device 115-a may include a receiver module 205, a dynamic sleep module 210, and/or a transmitter module 215. The device 115-a may also be or include a processor (not shown). Each of these modules may be in communication with each other.

The components of the device 115-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 205 may receive information such as packets, user data, and/or control information associated with various information channels (e.g., control channels, data channels, etc.). The receiver module 205 may receive messages from a millimeter wave base station 105 including information associated with synchronization signaling and communication scheduling information. Information may be passed on to the dynamic sleep module 210, and to other components of the device 115-*a*.

The dynamic sleep module 210 may manage communication scheduling information and may determine based on the communication scheduling information periods when the device 115-*a* may enter a sleep mode. The dynamic sleep module 210 may receive, via the receiver module 205, information relating to communication scheduling, and may generate dynamic sleep instructions for the device 115-*a*.

The transmitter module 215 may transmit the one or more signals received from other components of the device 115-*a*. The transmitter module 215 may transmit information such as packets, user data, and/or control information to a serving cell. The transmitter module 215 may send messages to a millimeter wave base station 105 in conjunction with various synchronization signaling operations, e.g., random access procedures, and other information. In some examples, the transmitter module 215 may be collocated with the receiver module 205 in a transceiver module.

Figure 3:
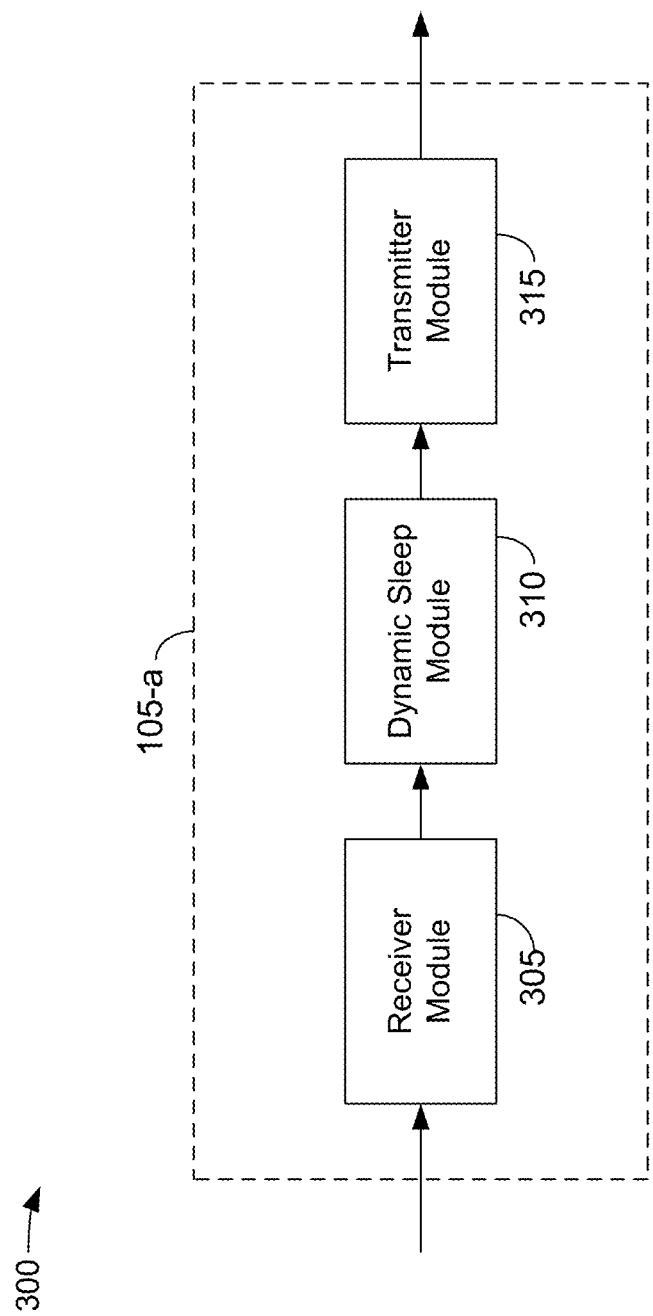
FIG. 3 is a block diagram showing a base station configured for use in wireless communication, in accordance with various aspects of the present disclosure.

FIG. 3 is a block diagram 300 of a base station 105-*a* for use in wireless communication, in accordance with various aspects of the present disclosure. The base station 105-*a* may be an example of one or more aspects of a base station 105 described with reference to FIG. 1. The base station 105-*a* may be a millimeter wave base station, and may also be referred to as an mWB. The base station 105-*a* may include a receiver module 305, a dynamic sleep module 310, and/or a transmitter module 315. The base station 105-*a* may also be or include a processor (not shown). Each of these modules may be in communication with each other.

The components of the base station 105-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 305 may receive information such as packets, user data, and/or control information associated with various information channels (e.g., control channels, data channels, etc.). The receiver module 305 may receive messages from a device 115 including communication information, and other parameters. Information may be passed on to the dynamic sleep module 310, and to other components of the base station 105-*a*.

The dynamic sleep module 310 may manage communication scheduling information for the base station 105-*a* and may generate predicted communication information timing over a serving beam to the transmitter module 315 for communication to a device 115 over a serving beam. The dynamic sleep module 310 may receive, via the receiver module 305, information from a device 115.

The transmitter module 315 may transmit the one or more signals received from other components of the base station 105-*a*. The transmitter module 315 may transmit information such as packets, user data, and/or control information to a device 115. The transmitter module 315 may send messages to a device 115 in conjunction with various synchronization signaling operations, e.g., random access procedures, a communication information scheduling information, and other information. In some examples, the transmitter module 315 may be collocated with the receiver module 305 in a transceiver module.

Figure 4:
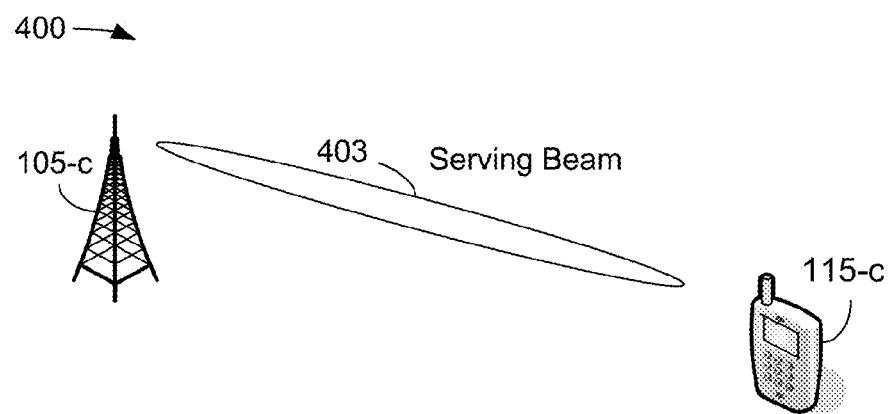
FIG. 4 is a block diagram of a communication system including a base station and a device for use in wireless communication, in accordance with various aspects of the present disclosure.

FIG. 4 is a block diagram 400 of a communication system including a base station 105-*c* and a device 115-*c* for use in wireless communication, in accordance with various aspects of the present disclosure. The base station 105-*c* may be an example of one or more aspects of a base station 105 described with reference to FIG. 1. It may also be an example of a base station 105-*a* described with reference to FIG. 3.

The device 115-*c* may be an example of one or more aspects of a UE 115 described with reference to FIG. 1. It may also be an example of a device 115-*a* described with reference to FIG. 2.

The device 115-*c* may be in bi-directional wireless communication with the base station 105-*c*. In an exemplary embodiment, the device 115-*c* may be in bi-directional wireless communication with the base station 105-*c* over a serving beam 403. In an exemplary embodiment, the serving beam 403 may be one of a plurality of directional communication beams that may be capable of operatively coupling the device 115-*c* to the base station 105-*c*. In an exemplary embodiment, the base station 105-*c* may communicate information to one or more devices, such as the device 115-*c*, relating to communication information scheduling, that may allow the device 115-*c* to enter an inactive state, such as a dynamic sleep mode.

Figure 5:
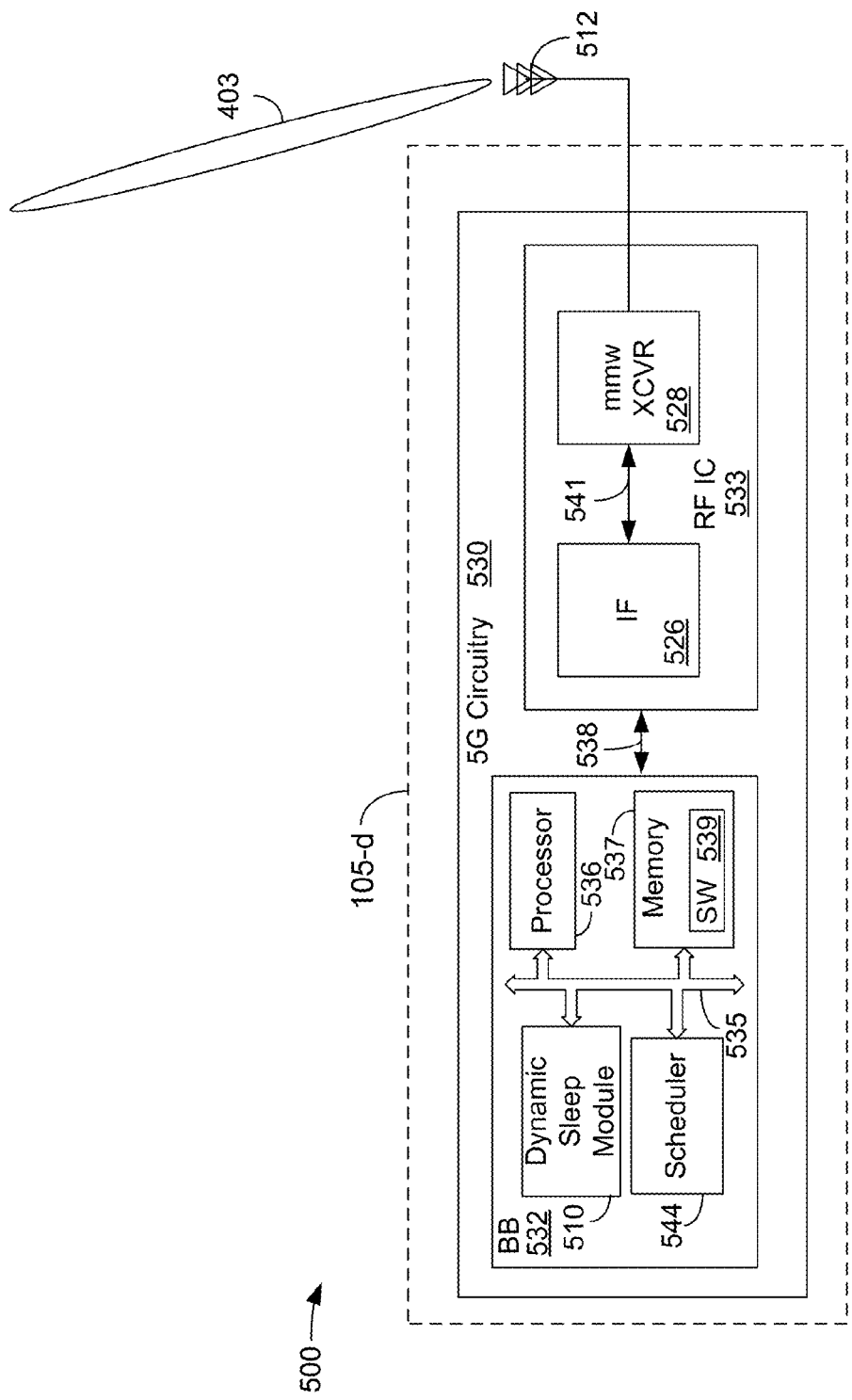
FIG. 5 shows a system for use in wireless communication, in accordance with various aspects of the present disclosure.

FIG. 5 shows a system 500 for use in wireless communication, in accordance with various aspects of the present disclosure. The system 500 may include a base station 105-*d*, which may be an example of the base station 105 of FIG. 1. The base station 105-*d* may also be an example of one or more aspects of base stations 105 of FIGS. 3 and/or 4. The base station 105-*d* may comprise 5G circuitry 530. Some of the operational elements of the 5G circuitry 530 may be omitted for ease of description, and are known to those having ordinary skill in the art.

The base station 105-*d* may generally include components for bi-directional voice and data communications including components for transmitting communications and components for receiving communications. The base station 105-*d* may include an antenna 512 coupled to the 5G circuitry 530. The antenna 512 may comprise one or more antenna elements, may comprise an array, or a phased array, of antenna elements, and may comprise one or more directional and/or omni-directional antenna elements. The 5G circuitry 530 may be configured to establish a 5G communication channel with a device 115 (not shown). In an exemplary embodiment, the communication channel may be established over a serving beam 403.

The 5G circuitry 530 may comprise a baseband system 532 and a radio frequency integrated circuit (RFIC) 533, operatively coupled together over a bi-directional connection 538. The baseband system 532 may comprise a processor 536, a memory 537 (including software (SW) 539), a dynamic sleep module 510, and a scheduler 544, which may communicate, directly or indirectly, with each other (e.g., via one or more buses 535). The scheduler 544 may be configured to determine ahead of time, information destined to be communicated over the serving beam 403 to one or more devices 115 (not shown). The RFIC 533 may comprise an intermediate frequency (IF) sub-system 526 and a transceiver module 528 operatively coupled together over a bi-directional connection 541. In an exemplary embodiment, the transceiver module 528 may be configured to communicate over millimeter wave (mmw) frequencies. The transceiver module 528 may communicate bi-directionally, via the antenna(s) 512 and/or one or more wired or wireless links, with one or more networks, as described above. For example, the transceiver module 528 may communicate bi-directionally with devices 115 (not shown). The transceiver module 528 may include a modem to modulate the packets and provide the modulated packets to the antenna(s) 512 for transmission, and to demodulate packets received from the antenna(s) 512. While the base station 105-*d* may include a single antenna 512 the base station 105-*d* may have multiple antennas capable of concurrently transmitting and/or receiving multiple wireless transmissions via carrier aggregation techniques, for example. The transceiver module 528 may be capable of concurrently communicating with one or more devices 115 via multiple component carriers.

The base station 105-*d* may include a dynamic sleep module 510, which may perform the functions described above for the dynamic sleep module 310 of base stations 105 of FIGS. 1, 3, and/or 4. In an exemplary embodiment, the dynamic sleep module 510 may be configured to communicate with a device 115 to inform the device 115, and other devices 115 on the serving beam 403, of communication information destined for that serving beam 403 ahead of time, including, for example, a predicted period of inactivity, and/or a predicted gap in one or more periods of activity, during which a device 115 may enter an inactive state, such as a dynamic sleep mode or dynamic sleep state, as described herein.

The memory 537 may include random access memory (RAM) and read-only memory (ROM). The memory 537 may store computer-readable, computer-executable software/firmware code 539 containing instructions that, when executed, cause the processor 536 to perform various functions described herein (e.g., perform synchronization operations, synchronize reference timing parameters, sending communication scheduling information, dynamic sleep operations, etc.). Alternatively, the computer-readable, computer-executable software/firmware code 539 may not be directly executable by the processor 536 but cause a computer (e.g., when compiled and executed) to perform functions described herein. The processor 536 may include an intelligent hardware device, e.g., a central processing unit (CPU), a microcontroller, an application-specific integrated circuit (ASIC), etc.

Figure 6:
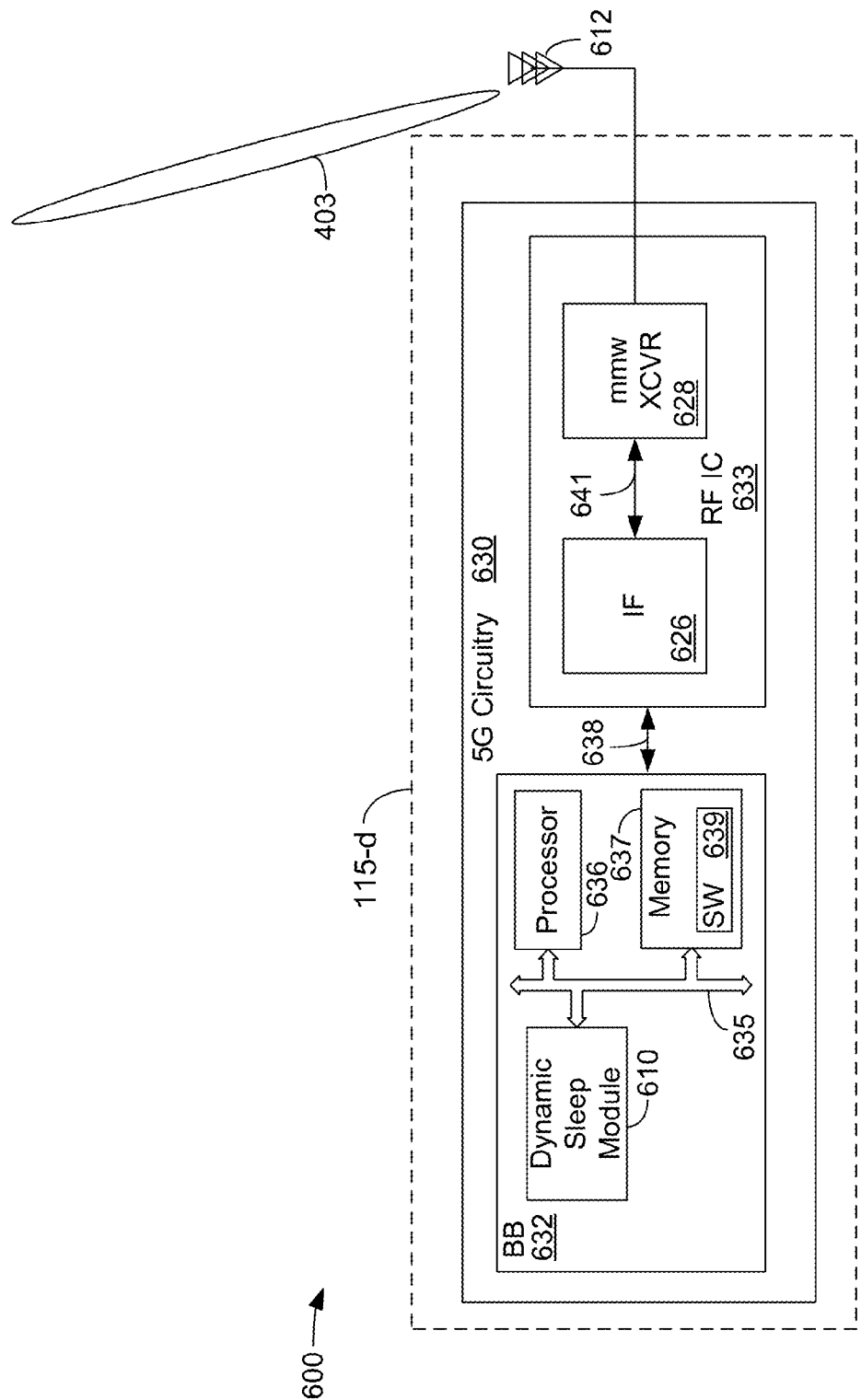
FIG. 6 shows a system for use in wireless communication, in accordance with various aspects of the present disclosure.

FIG. 6 shows a system 600 for use in wireless communication, in accordance with various aspects of the present disclosure. The system 600 may include a device 115-*d*, which may be an example of the UE 115 of FIG. 1. The device 115-*d* may also be an example of one or more aspects of devices 115 of FIGS. 2, and/or 4. The device 115-*d* may comprise 5G circuitry 630. Some of the operational elements of the 5G circuitry 630 may be omitted for ease of description, and are known to those having ordinary skill in the art.

The device 115-*d* may generally include components for bi-directional voice and data communications including components for transmitting communications and components for receiving communications. The device 115-*d* may include an antenna 612 coupled to the 5G circuitry 630. The antenna 612 may comprise one or more antenna elements, may comprise an array, or a phased array, of antenna elements, and may comprise one or more directional and/or omni-directional antenna elements. The 5G circuitry 630 may be configured to establish a 5G communication channel with a base station 105 (not shown). In an exemplary embodiment, the communication channel may be established over a serving beam 403.

The 5G circuitry 630 may comprise a baseband system 632 and a radio frequency integrated circuit (RFIC) 633 operatively coupled together over a bi-directional connection 638. The baseband system 632 may comprise a processor 636, a memory 637 (including software (SW) 639), and a dynamic sleep module 610, which each may communicate, directly or indirectly, with each other (e.g., via one or more buses 635). The RFIC 633 may comprise an intermediate frequency (IF) sub-system 626 and a transceiver module 628 operatively coupled together over a bi-directional connection 641. In an exemplary embodiment, the transceiver module 628 may be configured to communicate over millimeter wave (mmw) frequencies. The transceiver module 628 may communicate bi-directionally, via the antenna(s) 612 and/or one or more wired or wireless links, with one or more networks, as described above. For example, the transceiver module 628 may communicate bi-directionally with base stations 105 (not shown), with other UEs 115, and/or with devices 115 with reference to FIG. 1, 2, 3, or 4. The transceiver module 628 may include a modem to modulate the packets and provide the modulated packets to the antenna(s) 612 for transmission, and to demodulate packets received from the antenna(s) 612. While the UE 115-*d* may include a single antenna 612 for the 5G circuitry 630, the UE 115-*d* may have multiple antennas capable of concurrently transmitting and/or receiving multiple wireless transmissions via carrier aggregation techniques, for example. The transceiver module 628 may be capable of concurrently communicating with one or more base stations 105 via multiple component carriers.

The device 115-*d* may include a dynamic sleep module 610, which may perform the functions described above for the dynamic sleep module 210 of devices 115 of FIGS. 1, 2, and/or 4. In an exemplary embodiment, the dynamic sleep module 610 may be configured to communicate with a base station 105 to receive and process communication scheduling information that may allow the device 115-*d* to enter an inactive state, such as a dynamic sleep mode or a dynamic sleep state as described herein.

The memory 637 may include random access memory (RAM) and read-only memory (ROM). The memory 637 may store computer-readable, computer-executable software/firmware code 639 containing instructions that, when executed, cause the processor 636 to perform various functions described herein (e.g., perform synchronization operations, synchronize reference timing parameters, receiving communication scheduling information, dynamic sleep operations, etc.). Alternatively, the computer-readable, computer-executable software/firmware code 639 may not be directly executable by the processor 636 but cause a computer (e.g., when compiled and executed) to perform functions described herein. The processor 636 may include an intelligent hardware device, e.g., a central processing unit (CPU), a microcontroller, an application-specific integrated circuit (ASIC), etc.

Figure 7:
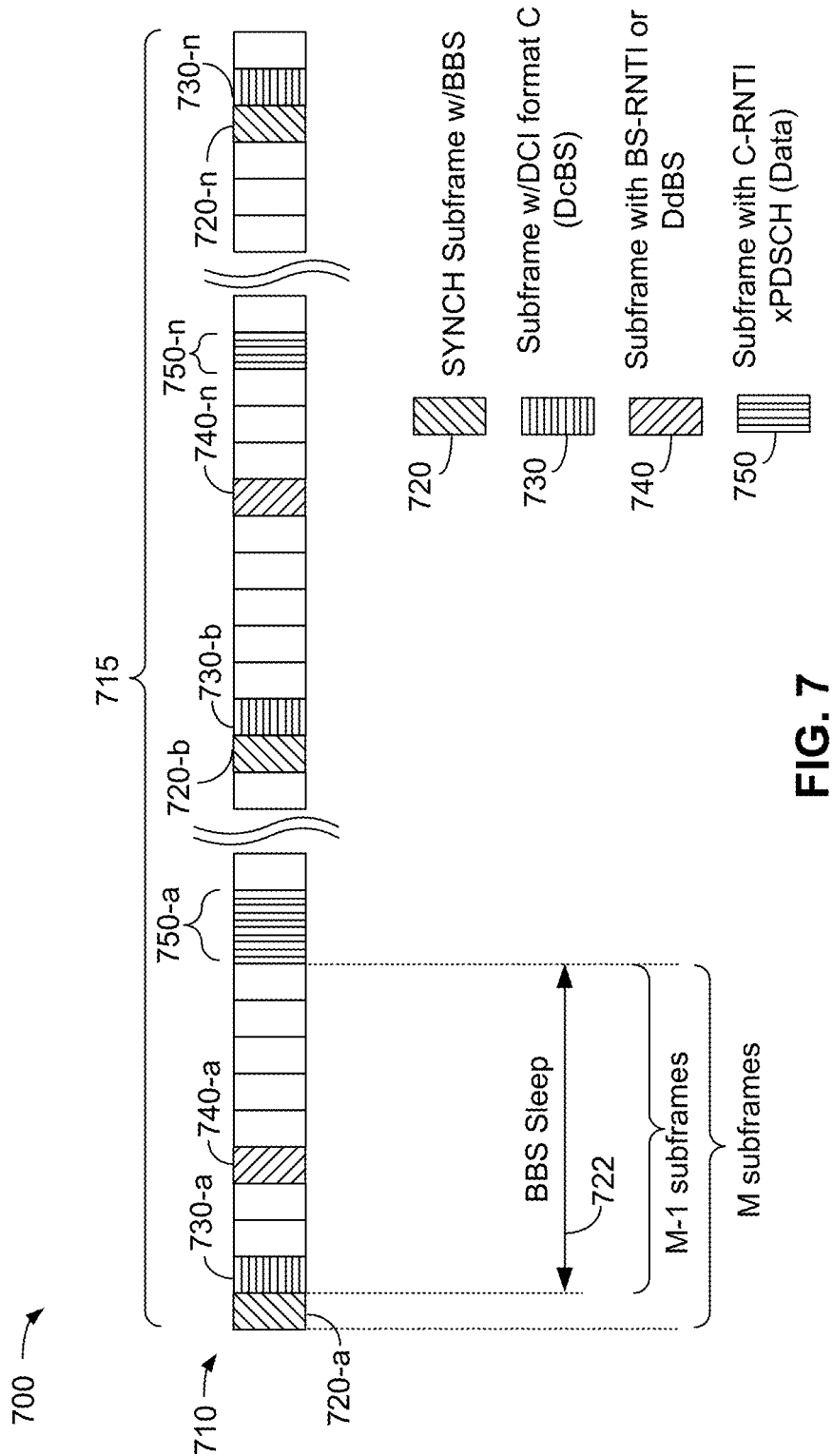
FIG. 7 is a timing diagram for use in wireless communication, in accordance with various aspects of the present disclosure.

FIG. 7 is a timing diagram 700 for use in wireless communication, in accordance with various aspects of the present disclosure. The timing diagram 700 illustrates an exemplary embodiment of an ability of a UE 115 to enter an inactive state, such as a dynamic sleep mode, based upon receiving communication scheduling information from a base station 105 over a serving beam 403. In the example of FIG. 7, it is assumed that a DRX inactivity timer is running, or that the UE 115 is not configured in C-DRX mode.

The timing diagram 700 comprises a communication stream 710. The communication stream 710 comprises a plurality of subframes 715. In the example shown in FIG. 7, a synchronization subframe 720 (720-*a*, 720-*b*, etc., through 720-*n*) may be transmitted from the base station 105 over a serving beam 403 to each UE 115 on the serving beam 403 every 25 subframes.

In an exemplary embodiment, the communication scheduling information may include, for example, predicted communication activity including a predicted inactivity period, and may be sent by the base station 105 over the serving beam 403 to all UEs 115 on the serving beam 403. In an exemplary embodiment, the communication scheduling information may be included in the synchronization frame 720-*a*, for example, as part of a physical broadcast channel (PBCH) communication. Such a communication may include a particular subframe type referred to as a Broadcast with Beam Scheduling (BBS) subframe. A BBS subframe may inform the UE 115 that the UE is not to receive a data communication over the serving beam 403 for M subframes, where M may be dependent on the operation and implementation of the scheduler 544 in the base station 105, or other operating parameters. In an exemplary embodiment, in response to this scheduling information, in this example, each UE 115 on the serving beam 403 may determine that it may sleep for M−1 subframes, assuming the UE 115 does not have any information destined for the base station 105 in that M−1 subframe period. In this example, the UE 115 may sleep for the period of time indicated by the arrow 722, which corresponds to M−1 subframes, which allows the UE 115 to awaken and reestablish a communication channel with the base station 105 prior to the arrival of the data 750-*a*. Data being communicated from the base station 105 to the UE 115 is illustrated as subframes 750 (750-*a* through 750-*n*) having C-RNTI (connected-RNTI) xPDSCH data.

Figure 8:
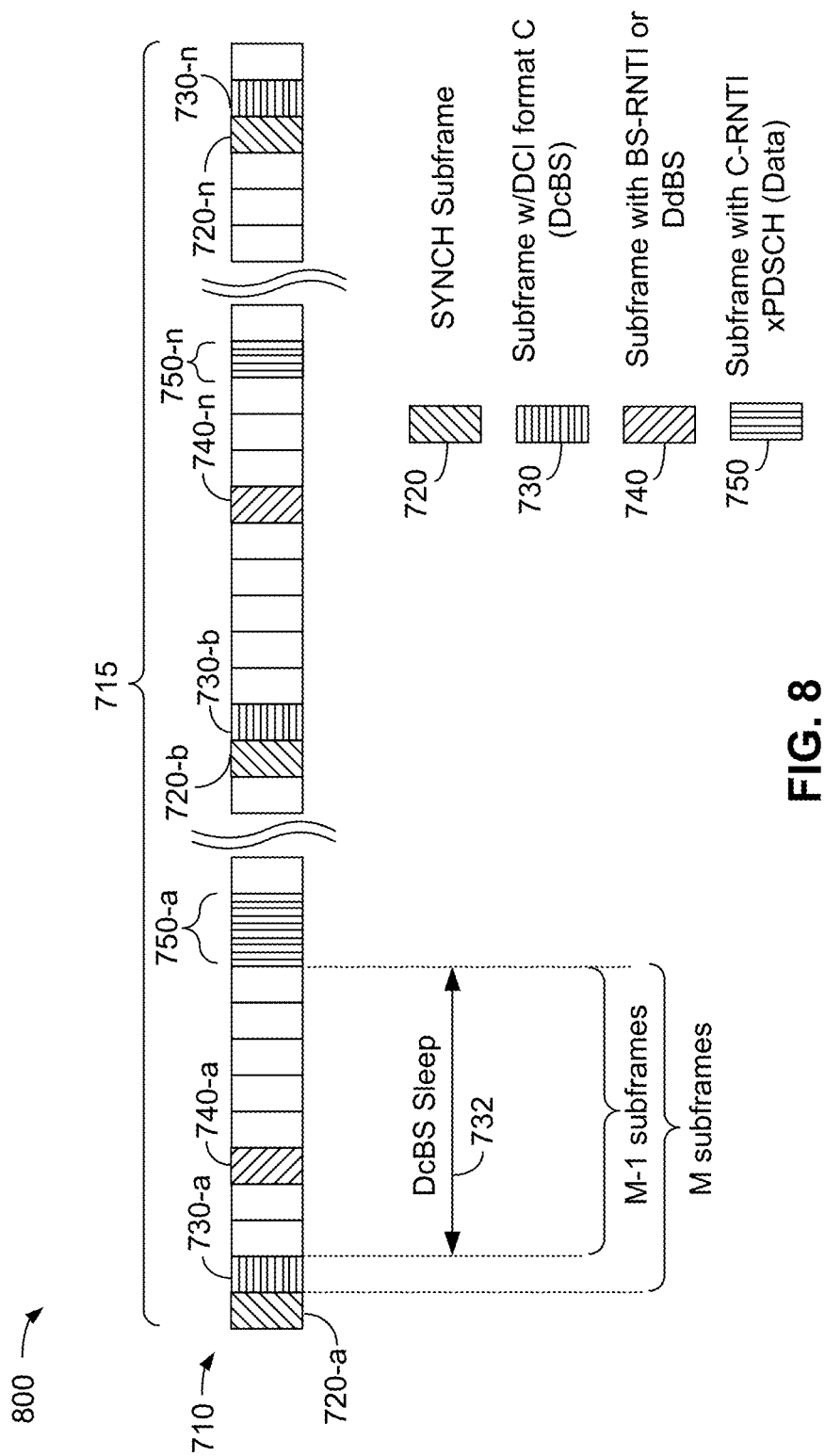
FIG. 8 is a timing diagram for use in wireless communication, in accordance with various aspects of the present disclosure.

FIG. 8 is a timing diagram 800 for use in wireless communication, in accordance with various aspects of the present disclosure. The timing diagram 800 shows an alternative exemplary embodiment of a base station 105 sending the scheduling information to a UE 115.

In the alternative exemplary embodiment shown in FIG. 8, the scheduling information may be sent by the base station 105 to the UE 115 on the serving beam 403 as part of a DCI communication (for example, as a Downlink Control with Beam Scheduling (DcBS) communication). An example of a DcBS communication is shown in subframes 730 (730-*a*, 730-*b*, etc., through 730-*n*). For example, if the base station sends communication scheduling information in the DcBS subframe 730-*a*, then the UE 115 may sleep for the period of time indicated by the arrow 732, which corresponds to M−1 subframes, which allows the UE 115 to awaken and reestablish a communication channel with the base station 105 prior to the arrival of the data 750-*a*.

Figure 9:
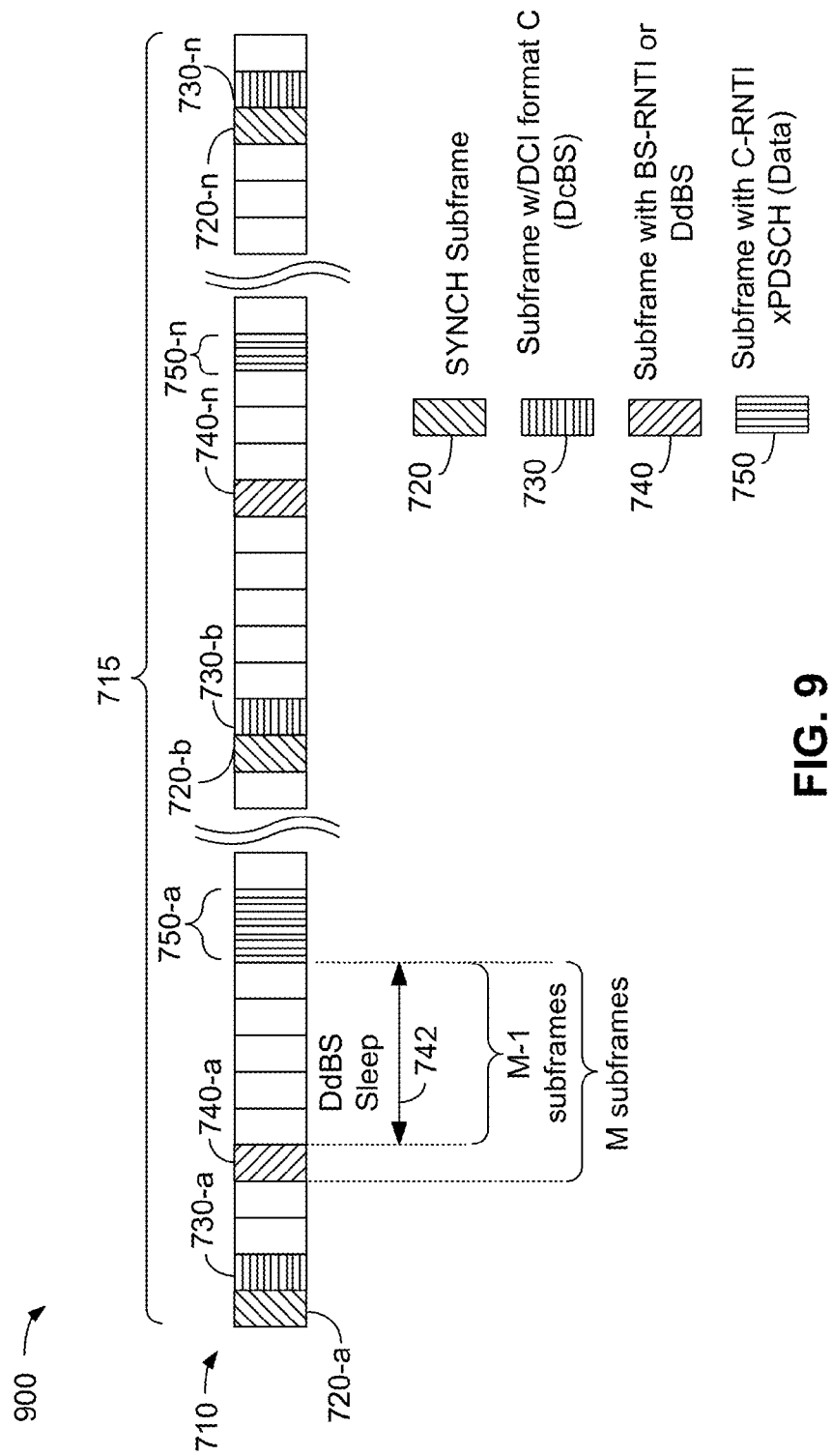
FIG. 9 is a timing diagram for use in wireless communication, in accordance with various aspects of the present disclosure.

FIG. 9 is a timing diagram 900 for use in wireless communication, in accordance with various aspects of the present disclosure. The timing diagram 900 shows an alternative exemplary embodiment of the base station sending the scheduling information to a UE.

In the alternative exemplary embodiment shown in FIG. 9, the scheduling information may be sent by the base station 105 to the UE 115 on the serving beam 403 as part of a data communication (for example, as part of a PDSCH channel having, for example, a Downlink data with Beam Scheduling (DdBS)) communication, a Beam Scheduling with Radio Network Temporary Identifier (BS-RNTI) communication, or other communication. For example, if the base station sends communication scheduling information in the DdBS or BS-RNTI subframe 740 (740-*a*, 740-*b*, etc., through 740-*n*), such as subframe 740-*a*, then the UE 115 may sleep for the period of time indicated by the arrow 742, which corresponds to M−1 subframes, which allows the UE 115 to awaken and reestablish a communication channel with the base station 105 prior to the arrival of the data 750-*a*.

Figure 10:
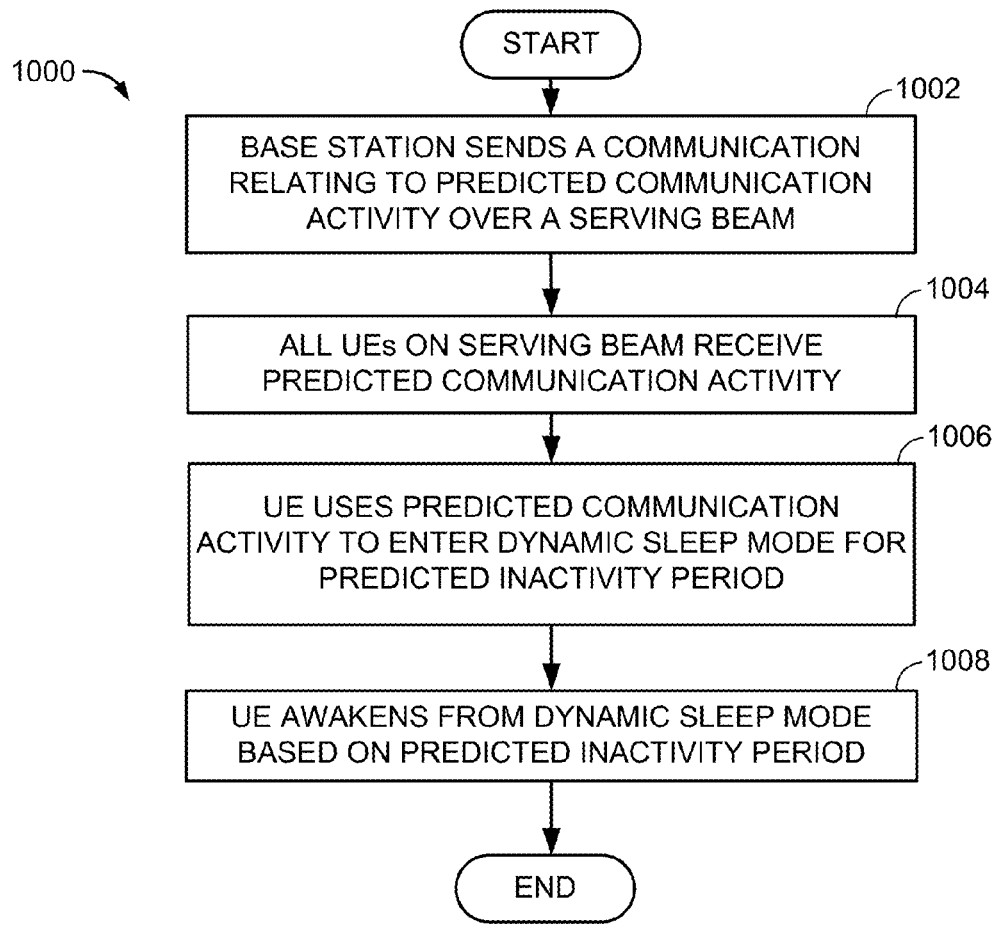
FIG. 10 is a flow chart illustrating an example of a method for communication, in accordance with various aspects of the present disclosure.

FIG. 10 is a flow chart 1000 illustrating an example of a method for communication, in accordance with various aspects of the present disclosure. The blocks in the method 1000 can be performed in or out of the order shown, and in some embodiments, can be performed at least in part in parallel.

In block 1002, the base station 105 sends a communication related to predicted communication activity, including a predicted inactivity period for a serving beam, over a serving beam 403. For example, the communication related to predicted communication activity may be sent as part of a PBCH communication, such as a particular subframe type, referred to as a Broadcast with Beam Scheduling (BBS) subframe. In another example, the communication related to predicted communication activity may be sent as part of a DCI communication (for example, as a Downlink Control with Beam Scheduling (DcBS) communication. In another example, the communication related to predicted communication activity may be sent as part of a data communication (for example, as part of a PDSCH channel having, for example, a Downlink data with Beam Scheduling (DdBS)) communication, a Beam Scheduling with Radio Network Temporary Identifier (BS-RNTI) communication, or other communication.

In block 1004, all UEs 115 on the serving beam receive the predicted communication activity, including a predicted inactivity period for the serving beam 403 from the base station 105.

In block 1006, each UE on the serving beam 403 may use the predicted communication activity, including a predicted inactivity period to enter a dynamic sleep mode. The duration of the dynamic sleep mode may be related to the manner in which the predicted inactivity period is communicated to the UEs on the serving beam 403, as described herein.

In block 1008, the UE awakens from the dynamic sleep mode based on the predicted communication activity, including a predicted inactivity period. For example, when the UE 115 receives a communication that the UE is not to receive a data communication over the serving beam 403 for M subframes, each UE 115 on the serving beam 403 may determine that it may sleep for M−1 subframes, assuming the UE 115 does not have any information destined for the base station 105 in that M−1 subframe period.

Figure 11:
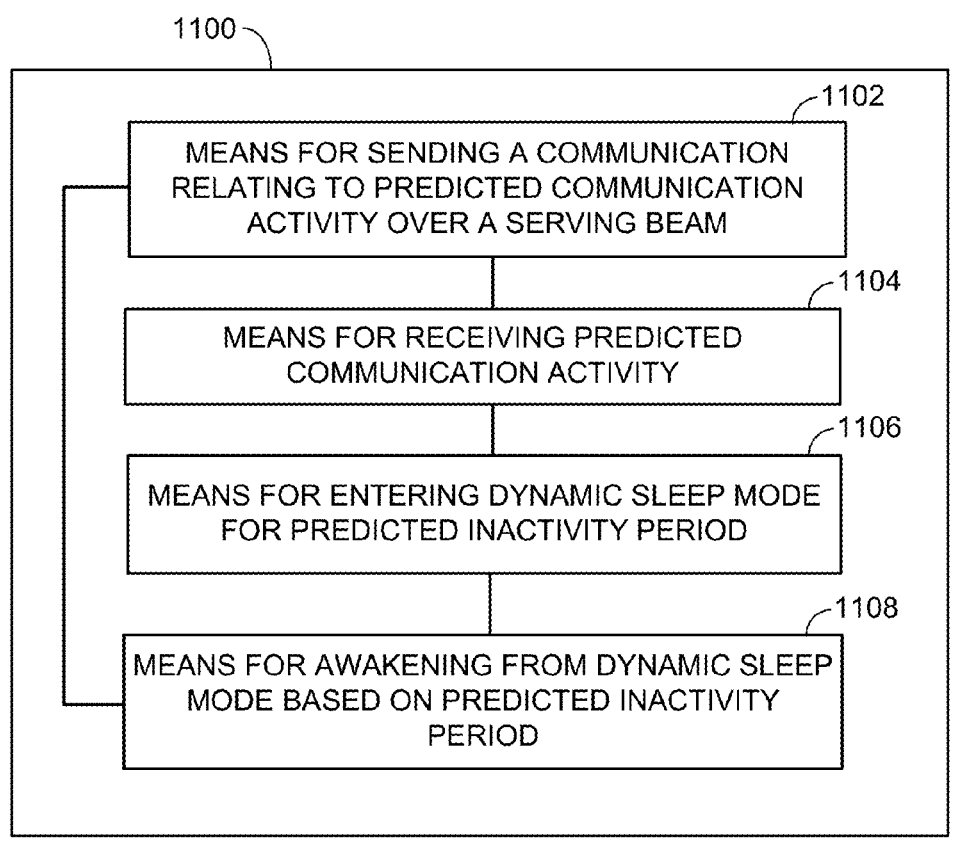
FIG. 11 is a functional block diagram of an apparatus for communication, in accordance with various aspects of the present disclosure.

FIG. 11 is a functional block diagram of an apparatus 900 for communication, in accordance with various aspects of the present disclosure. The apparatus 1100 comprises means 1102 for sending a communication related to predicted communication activity, including a predicted inactivity period for a serving beam, over a serving beam. In certain embodiments, the means 1102 for means 1102 for sending a communication related to predicted communication activity over a serving beam can be configured to perform one or more of the function described in operation block 1002 of method 1000 (FIG. 10). In an exemplary embodiment, the means 1102 for sending a communication related to predicted communication activity over a serving beam may comprise the base station 105 communicating predicted communication inactivity to each UE 115 over a serving beam 403.

The apparatus 1100 further comprises means 1104 for receiving predicted communication activity. In certain embodiments, the means 1104 for receiving predicted communication activity can be configured to perform one or more of the function described in operation block 1004 of method 1000 (FIG. 10). In an exemplary embodiment, the means 1104 for receiving predicted communication activity may comprise each UE 115 on a serving beam 403 receiving the predicted communication activity sent by the base station 105. In an exemplary embodiment, the predicted communication activity may include predicted inactivity information that a UE may use to enter a dynamic sleep mode.

The apparatus 1100 further comprises means 1106 for entering dynamic sleep mode for the predicted inactivity period. In certain embodiments, the means 1106 for entering dynamic sleep mode for the predicted inactivity period can be configured to perform one or more of the function described in operation block 1006 of method 1000 (FIG. 10). In an exemplary embodiment, the means 1106 for entering dynamic sleep mode for the predicted inactivity period may comprise each UE 115 on the serving beam 403 entering a dynamic sleep mode. The duration of the dynamic sleep mode may be related to the manner in which the predicted inactivity period is communicated to the UEs on the serving beam 403, as described herein.

The apparatus 1100 further comprises means 1108 for awakening from dynamic sleep mode based on the predicted inactivity period. In certain embodiments, the means 1108 for awakening from dynamic sleep mode based on the predicted inactivity period can be configured to perform one or more of the function described in operation block 1008 of method 1000 (FIG. 10). In an exemplary embodiment, the means 1108 for awakening from dynamic sleep mode based on the predicted inactivity period may comprise each UE on the serving beam 403 entering a dynamic sleep mode for M subframes and awakening at a period corresponding to M−1 subframes.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for communicating system activity in a communication system, comprising:
   receiving communication beam activity information, the communication beam activity information related to communication information destined for a user device on a communication beam, the communication beam activity information comprising information relating to a number of communication subframes over which data inactivity is predicted for the user device on the communication beam; and
   using the communication beam activity information to determine a period within which the user device may enter an inactive state.

2. The method of claim 1, wherein the number of communication subframes is M and the user device may enter the inactive state for M−1 subframes.

3. The method of claim 1, wherein the communication beam activity information is received over a physical broadcast channel (PBCH) communication including a broadcast with beam scheduling (BBS) subframe type.

4. The method of claim 1, wherein the communication beam activity information is received as part of a downlink control information (DCI) with beam scheduling (DcBS) communication.

5. The method of claim 1, wherein the communication beam activity information is received as part of a physical downlink shared channel (PDSCH) having a downlink data with beam scheduling (DdBS) communication.

6. The method of claim 1, wherein the communication beam activity information is received as part of a beam scheduling with radio network temporary identifier (BS-RNTI) communication.

7. An apparatus for communicating system activity in a communication system, comprising:
   a user device configured to receive communication beam activity information, the communication beam activity information related to communication information destined for the user device on a communication beam, the communication beam activity information comprising information relating to a number of communication subframes over which data inactivity is predicted for the user device on the communication beam; and
   the user device configured to use the communication beam activity information to determine a period within which the user device may enter an inactive state.

8. The apparatus of claim 7, wherein the number of communication subframes is M and the user device may enter the inactive state for M−1 subframes.

9. The apparatus of claim 7, wherein the communication beam activity information is received over a physical broadcast channel (PBCH) communication including a broadcast with beam scheduling (BBS) subframe type.

10. The apparatus of claim 7, wherein the communication beam activity information is received as part of a downlink control information (DCI) with beam scheduling (DcBS) communication.

11. The apparatus of claim 7, wherein the communication beam activity information is received as part of a physical downlink shared channel (PDSCH) having a downlink data with beam scheduling (DdBS) communication.

12. The apparatus of claim 7, wherein the communication beam activity information is received as part of a beam scheduling with radio network temporary identifier (BS-RNTI) communication.

13. A device, comprising:
   means for receiving communication beam activity information, the communication beam activity information related to communication information destined for a user device on a communication beam, the communication beam activity information comprising information relating to a number of communication subframes over which data inactivity is predicted for the user device on the communication beam; and
   means for using the communication beam activity information to determine a period within which the user device may enter an inactive state.

14. The device of claim 13, wherein the number of communication subframes is M and the user device may enter the inactive state for M−1 subframes.

15. The device of claim 13, further comprising means for receiving the communication beam activity information over a physical broadcast channel (PBCH) communication including a broadcast with beam scheduling (BBS) subframe type.

16. The device of claim 13, further comprising means for receiving the communication beam activity information as part of a downlink control information (DCI) with beam scheduling (DcBS) communication.

17. The device of claim 13, further comprising means for receiving the communication beam activity information as part of a physical downlink shared channel (PDSCH) having a downlink data with beam scheduling (DdBS) communication.

18. The device of claim 13, further comprising means for receiving the communication beam activity information as part of a beam scheduling with radio network temporary identifier (BS-RNTI) communication.

19. A non-transitory computer-readable medium storing computer executable code for communicating system activity in a communication system, the code executable by a processor to:
  receive communication beam activity information, the communication beam activity information related to communication information destined for a user device on a communication beam, the communication beam activity information comprising information relating to a number of communication subframes over which data inactivity is predicted for the user device on the communication beam; and
  use the communication beam activity information to determine a period within which the user device may enter an inactive state.

20. The non-transitory computer-readable medium of claim 19, wherein the number of communication subframes is M and the code is executable by a processor to allow the user device to enter the inactive state for M−1 subframes.

21. The non-transitory computer-readable medium of claim 19, wherein code is executable by a processor to receive the communication beam activity information over a physical broadcast channel (PBCH) communication including a broadcast with beam scheduling (BBS) subframe type.

22. The non-transitory computer-readable medium of claim 19, wherein the code is executable by a processor to receive the communication beam activity information as part of a downlink control information (DCI) with beam scheduling (DcBS) communication.

23. The non-transitory computer-readable medium of claim 19, wherein the code is executable by a processor to receive the communication beam activity information as part of a physical downlink shared channel (PDSCH) having a downlink data with beam scheduling (DdBS) communication.

24. The non-transitory computer-readable medium of claim 19, wherein the code is executable by a processor to receive the communication beam activity information as part of a beam scheduling with radio network temporary identifier (BS-RNTI) communication.

* * * * *